(12) United States Patent
Calvaresse et al.

(10) Patent No.: US 8,752,761 B2
(45) Date of Patent: Jun. 17, 2014

(54) LOCATIONING USING MOBILE DEVICE, CAMERA, AND A LIGHT SOURCE

(71) Applicant: Symbol Technologies, Inc., Schaumburg, IL (US)

(72) Inventors: Russell E. Calvaresse, Stony Brook, NY (US); Timothy B. Austin, Stony Brook, NY (US); Michael O'Haire, Smithtown, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 13/623,961

(22) Filed: Sep. 21, 2012

(65) Prior Publication Data

US 2014/0084050 A1 Mar. 27, 2014

(51) Int. Cl.
*G06K 7/00* (2006.01)

(52) U.S. Cl.
USPC ........................................................ 235/439

(58) Field of Classification Search
USPC ............. 235/375, 439, 454, 462.01, 469, 494
See application file for complete search history.

(56) References Cited

U.S. PATENT DOCUMENTS

| | | | |
|---|---|---|---|
| 6,807,478 B2 * | 10/2004 | Giannopoulos et al. | 701/434 |
| 7,973,819 B2 * | 7/2011 | Shimada | 348/208.14 |
| 8,072,424 B2 | 12/2011 | Liberty | |
| 8,248,467 B1 | 8/2012 | Ganick et al. | |
| 2007/0275750 A1 * | 11/2007 | Nakagawa | 455/550.1 |
| 2009/0157309 A1 * | 6/2009 | Won et al. | 701/209 |
| 2009/0284366 A1 * | 11/2009 | Haartsen et al. | 340/531 |
| 2011/0010090 A1 | 1/2011 | Bae et al. | |
| 2011/0086618 A1 | 4/2011 | Degrazia et al. | |
| 2011/0148752 A1 | 6/2011 | Alameh et al. | |
| 2011/0153201 A1 * | 6/2011 | Park et al. | 701/201 |
| 2011/0176803 A1 | 7/2011 | Song et al. | |
| 2011/0244919 A1 | 10/2011 | Aller et al. | |
| 2011/0275408 A1 | 11/2011 | Kulik | |
| 2011/0281599 A1 | 11/2011 | Rodriguez | |
| 2012/0143495 A1 | 6/2012 | Dantu | |
| 2012/0154378 A1 | 6/2012 | Kitchens | |
| 2012/0202515 A1 | 8/2012 | Hsu et al. | |
| 2012/0214511 A1 | 8/2012 | Vartanian et al. | |
| 2013/0026224 A1 * | 1/2013 | Ganick et al. | 235/375 |

FOREIGN PATENT DOCUMENTS

| | | |
|---|---|---|
| WO | 2008108788 | 9/2008 |
| WO | 2012097098 A2 | 7/2012 |

OTHER PUBLICATIONS

"Visible Light Communications" posted Aug. 3, 2012 by Gordon Povey.
"Outstanding Technology Brings Visible Light Communication to Phones and Tablets Via Dongle and LEDs" by Michael Gorman posted Jul. 16, 2012.

* cited by examiner

*Primary Examiner* — Seung Lee
(74) *Attorney, Agent, or Firm* — Brian M. Mancini (57) ABSTRACT

A method and system for locationing of a mobile device (100) within an environment includes light sources (116) disposed within the environment and modified to provide a plurality of unique identity patterns (202) associated with particular locations within the environment. A camera (106) and image processor (102) of the mobile device can obtain images of a modified light source (200) and recognize the unique identity patterns in the image and a horizontal and vertical angle of a position of the light source in the image from a center position. An accelerometer (300) can capture the gravity vectors of the camera. A locationing engine (102, 130) can determine a location of the mobile device using the unique optical pattern, gravity vectors, and the horizontal and vertical angles.

11 Claims, 6 Drawing Sheets

LOCATIONING USING MOBILE DEVICE, CAMERA, AND A LIGHT SOURCE

FIELD OF THE DISCLOSURE

The present disclosure relates generally to a locationing system, and more particularly to a locationing system using a mobile device, single camera, and a light source.

BACKGROUND

There are many techniques that can be used to determine a location of a mobile device within an environment, such as a retail, factory, warehouse, or other indoor environment, for example. These can include locationing a radio communication device using radio frequency techniques, for example. However, radio frequency techniques do not provide a high degree of locationing accuracy.

Other techniques such as through the use of radio frequency based tags could also be used, for example. However, these other techniques require the installation of hardware within the environment, which adds cost.

Accordingly, there is a need for a technique to locate a mobile device in an indoor environment without modifying the mobile device hardware and without requiring additional expensive hardware within the environment for locationing purposes. It would also be beneficial if this technique could provide high locationing accuracy and a high positioning update rate.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

According to some embodiments of the present invention, an improved technique is described to locate a mobile device in an indoor environment without modifying the mobile device hardware and without requiring additional expensive hardware within the environment for locationing purposes. The present invention provides high locationing accuracy and a high positioning update rate. The present invention also provides this improved technique without significant or complicated infrastructure changes and maintenance.

The present invention provides a locationing system to locate a mobile device using slight modification of existing light sources within an environment. The present invention uses an existing camera and may use optical pattern recognition processing, which is available in nearly every smart phone that is manufactured today. The present invention can provide high locationing accuracy (e.g. one or two foot accuracy), high positioning update rates, low cost to add supporting infrastructure, and good performance in tight aisles with limited line of sight to large areas of ceiling.

The mobile device to be locationed can include a wide variety of business and consumer electronic platforms such as cellular radio telephones, mobile stations, mobile units, mobile nodes, user equipment, subscriber equipment, subscriber stations, mobile computers, access terminals, remote terminals, terminal equipment, cordless handsets, gaming devices, smart phones, personal computers, and personal digital assistants, and the like, all referred to herein as a device. Each device comprises a processor that can be further coupled to a camera, keypad, a speaker, a microphone, a display, signal processors, and other features, as are known in the art and therefore not shown or described in detail for the sake of brevity.

In general, components such as processors, memories, and optical interfaces are well-known. For example, processing units are known to comprise basic components such as, but not limited to, microprocessors, microcontrollers, memory cache, application-specific integrated circuits, and/or logic circuitry. Such components are typically adapted to implement algorithms and/or protocols that have been expressed using high-level design languages or descriptions, expressed using computer instructions, expressed using messaging logic flow diagrams.

Thus, given an algorithm, a logic flow, a messaging/signaling flow, and/or a protocol specification, those skilled in the art are aware of the many design and development techniques available to implement one or more processors that perform the given logic. Therefore, the entities shown represent a system that has been adapted, in accordance with the description herein, to implement various embodiments of the present invention. Furthermore, those skilled in the art will recognize that aspects of the present invention may be implemented in and across various physical components and none are necessarily limited to single platform implementations. For example, the memory and control aspects of the present invention may be implemented in any of the devices listed above or distributed across such components.

Figure 1:
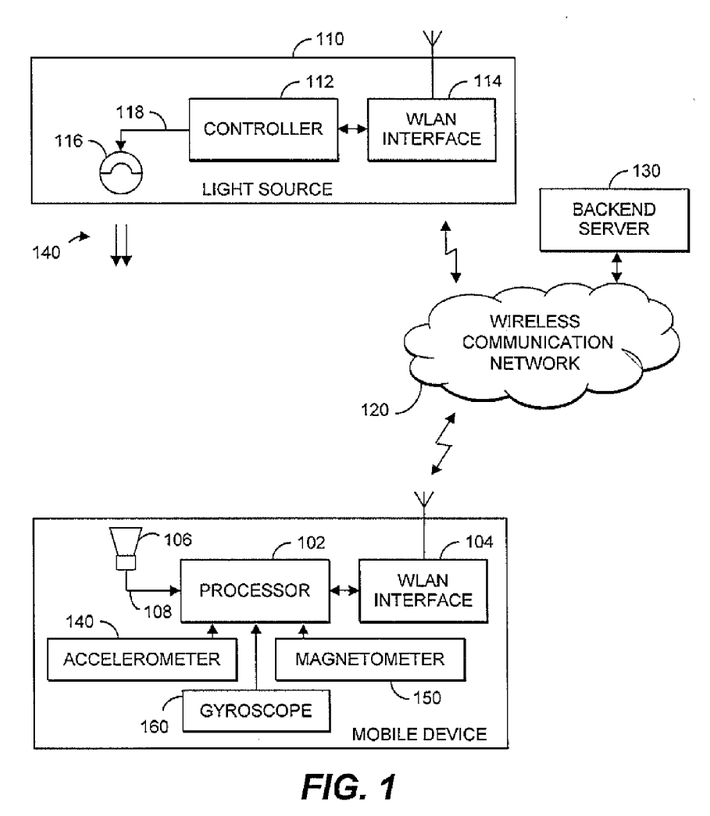
FIG. 1 is a simplified block diagram of a locationing system, in accordance with the present invention.

FIG. 1 is a block diagram of a locationing system, in accordance with the present invention. One or more light sources 116 can be implemented within the environment. The light source is modified to provide a unique identifying optical pattern (e.g. 140) that can include a particular image pattern, signal, or signal sequence using that particular light source. In one embodiment, the light source is a single point light emitting diode (LED). This LED could be controlled by an optional controller 112, which could be coupled to a wireless local area network interface 114 for wireless communication with other devices in the communication network 120, such as a backend server 130 that could program the LED controller. For example, the LED can be pulsed with a stored binary identity sequence. In another embodiment, the light source can be a simple fluorescent lamp with various filters to effectively create a barcode pattern on the lamp. The mobile device 100 can include a single camera 106 and image processor 102 to process the unique identity pattern 140 received by the camera. It is envisioned that the mobile device will have and use existing camera and image processing circuitry. It should be recognized that other components, including a controller and the like, are not shown for the sake of simplicity of the drawings.

The mobile device processor 102 can also be coupled to a controller (not shown) and wireless local area network interface 104 for wireless communication with other devices in the communication network 120, such as a backend server 130. Alternatively, the mobile device 100 could be connected to the communication network 120 through a wired interface connection (not shown), such as an Ethernet interface connection.

The wireless communication network 120 can include local and wide-area wireless networks, wired networks, or other IEEE 802.11 wireless communication systems, including virtual and extended virtual networks. However, it should be recognized that the present invention can also be applied to other wireless communication systems. For example, the description that follows can apply to one or more communication networks that are IEEE 802.xx-based, employing wireless technologies such as IEEE's 802.11, 802.16, or 802.20, modified to implement embodiments of the present invention. The protocols and messaging needed to establish such networks are known in the art and will not be presented here for the sake of brevity.

Figure 2:
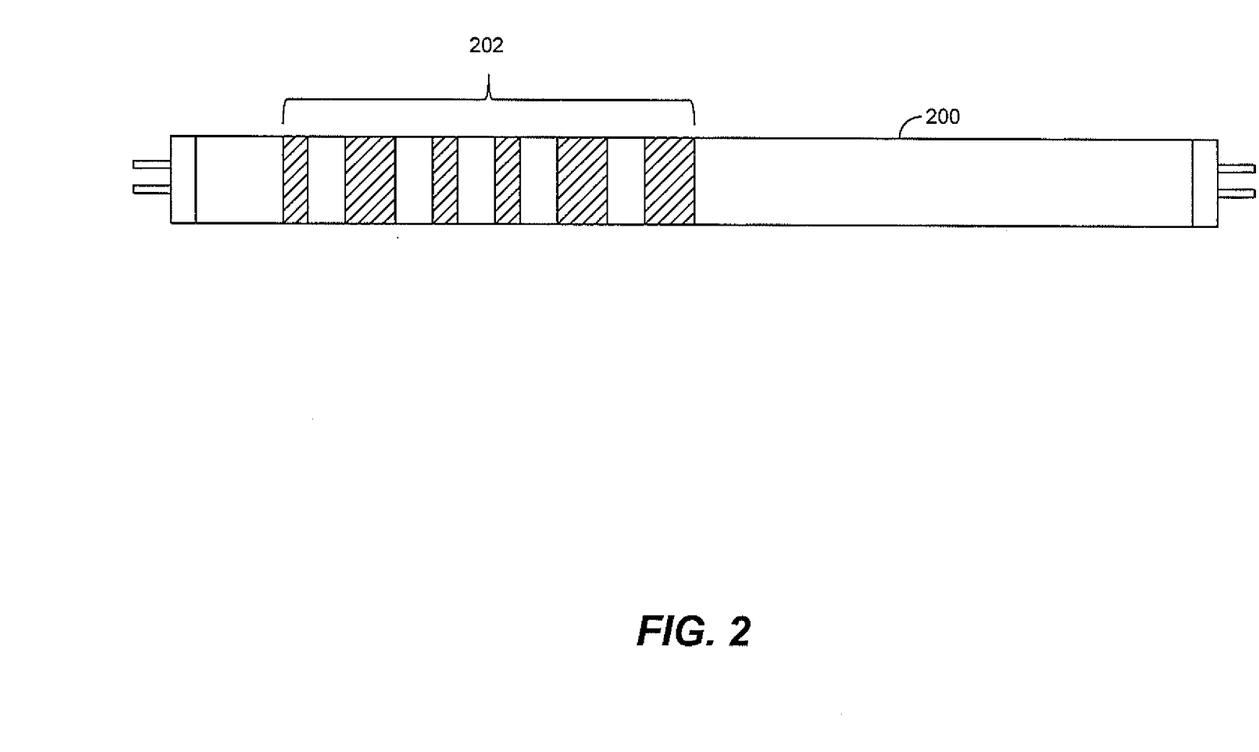
FIG. 2 is a front view of a modified fluorescent lamp, in accordance with one embodiment of the present invention.

In one embodiment, each light source 116 can be an existing fluorescent light fixture. As shown in FIG. 2, a fluorescent lamp 200 of the fixture can be modified to include bands of optical filters 202. The bands can be disposed on the lamp in a particular pattern recognizable to the image processing circuit of the mobile device as a one-dimensional barcode. Each modified fluorescent lamp can utilize a unique identifying (barcode) pattern. The filter bands can be easily disposed on the lamp. For example, the bands can be: rings that slide over the lamp, rings that can be clipped to the lamp, affixed onto a sleeve that slides over the lamp, or even painted onto the lamp. The filter bands can be of various opacities like 10%, 20% and 30% to provide more symbols, thereby reducing the number of needed filter bands on each tube. The filter bands could be a fully opaque black, or could have different colors and opacities in order to reduce the number of filter bands on each tube and increase the amount of light output. The image processing circuitry of the mobile device will be able to discern and decode the particular band color, size, and opacity in order for it or the backend server to determine the unique identifying code for that lamp.

In accordance with the present invention, each light fixture is fixed in a known location in the environment and is configured to provide an optical pattern code defining a location of a small region of the environment. The processor of the mobile device is operable to discern the particular optical pattern code received by its camera, which is then used to identify the pre-defined location of the light fixture that emitted that particular optical pattern code, and subsequently the device that detected that pattern code by association.

Typically a plurality of light fixtures can be disposed to cover an entire environment, each light fixture covering its own region overlapping other regions of other light fixtures. Each light fixture is assigned its own distinctive optical pattern (code) as its unique location by the backend server. In this way, a location of a mobile device can be determined through-out the environment by the mobile device detecting different optical pattern codes as it moves through different regions. In this scenario, a location engine will have the codes of each fixed light source and its location in the environment stored in a planogram or map. The location engine can be the mobile device processor 102 so that the mobile device 100 could determine its own location if it has the map. Alternatively, the location engine can be the backend server 130 so that the mobile device can transmit the codes it recognizes from the image over the communication network 120 to the backend server, which can determine the location region of the mobile device based on which codes it receives and the map.

Using existing light fixtures disposed in the ceiling of the environment results in reliable positioning since the location of each light fixture is known and fixed, and typically at regular spacing. In addition, ceiling light fixtures provide unobtrusiveness and clear sight lines.

Additional information could be provided by the mobile device to further improve the locationing accuracy. In particular, referring to FIG. 3, smart phones can include sensors such as an accelerometer 140, magnetometer 150, and gyroscope 160. The data from any of these sensors can be used to further pinpoint the location of a mobile device. For example, a three-axis accelerometer can be used to establish three-dimensional gravity vectors, $\alpha$, of the mobile device. With angle information for three axes, the mobile device would be free to rotate to any orientation using updated information from the accelerometer and/or gyroscope. Knowing the gravity vectors when the camera captures the image will establish that a center 304 of the image is at a particular three-dimensional angle from the gravity vectors. However, the gravity vectors do not establish the actual elevation of the light fixture, in particular since the light source may not be centered in the image and have an additional vertical and/or horizontal angle, $\beta$, from a center position of the image view making the actual elevation angle of the light source equal to the sum of $\alpha+\beta$. In addition, this elevation angle will only establish that the mobile device is located on a circle projected by a cone having sides angled at the elevation angle. The circle can be a circle on the floor or an imaginary circle at a height of the mobile device. However, the mobile device can provide further information to further pinpoint its azimuth location on that circle.

Figure 3:
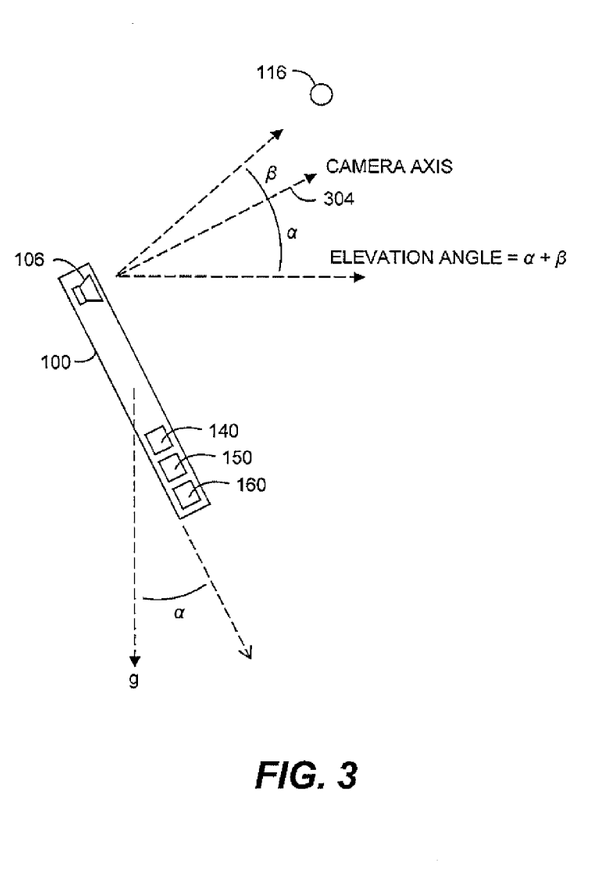
FIG. 3 is a graphical representation of angular determination, in accordance with the present invention.

For example, the magnetometer 302 could be used to establish the orientation of the mobile device referenced to magnetic north when the image was captured, thereby establishing its location on the circle considering azimuth information derived from the magnetometer and elevation angle. Magnetometer correction methods, if available, can further increase accuracy. However, magnetometers can be subject to errors due to stray magnetic fields from equipment and machinery. Therefore, alternatively or additionally, the image itself can be used to establish the position of the mobile device on the circle. For example, the orientation, □, of the lamp in the image, or the unique optical pattern, can be used to establish the viewing angle of the mobile device, e.g. the lamp is at a ten-degree angle in the image with the bar code on the left side of the lamp. The backend server knows the position and orientation of the lamp and the barcode on the lamp, and therefore can calculate the azimuth position of mobile device to establish its location on the circle. Knowing the gravity vectors, a position of the light source in the image, a magnetometer reading and/or a viewing angle of the light source in image, a known height of the light source, and an assumed height of the mobile device off of the floor, is all that is needed to accurately locate the mobile device. Inertial navigation techniques, using the accelerometer and/or gyroscope for example, could be incorporated to further improve the locationing accuracy or provide a motion vector for the mobile device.

Figure 6:
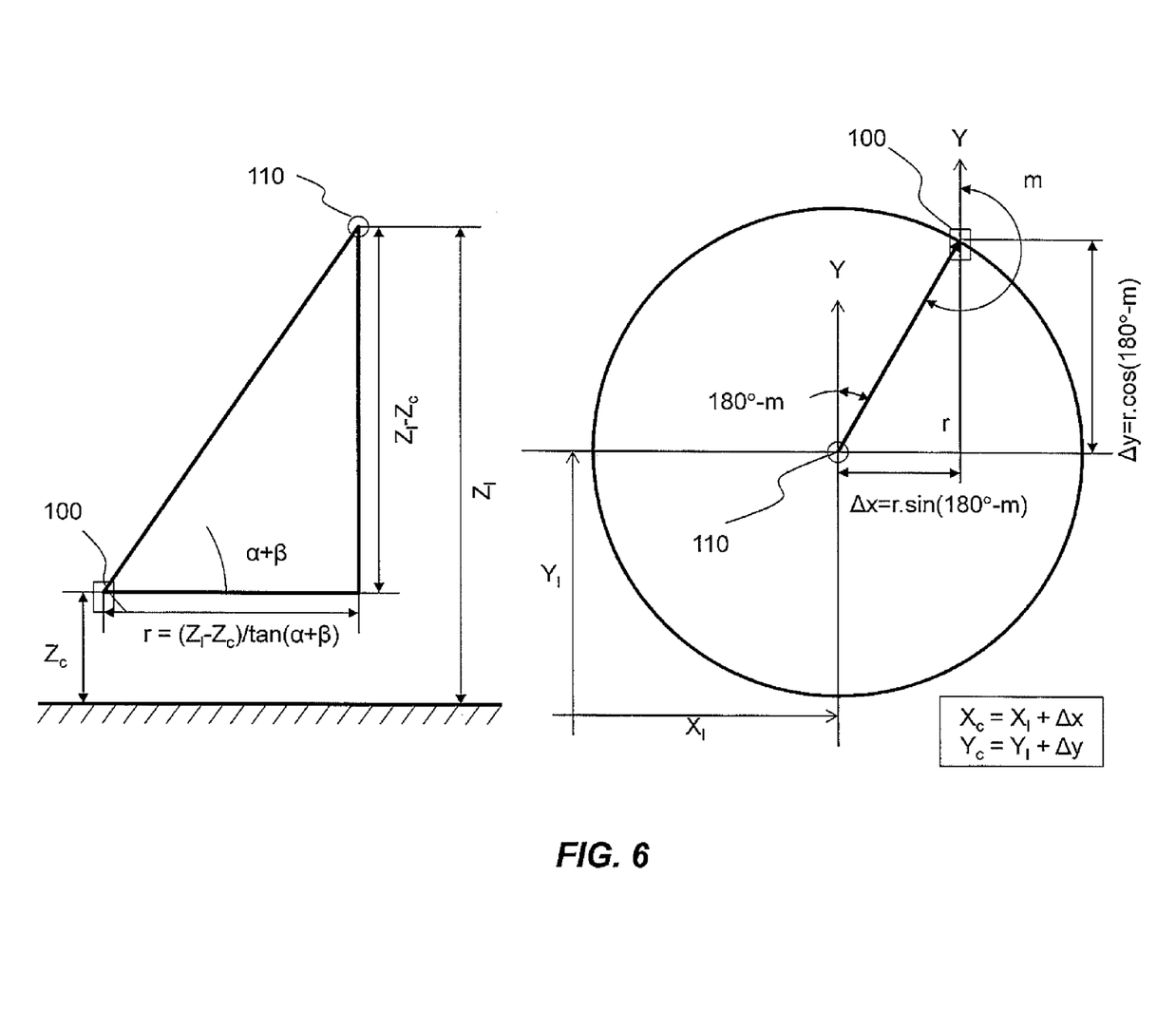
FIG. 6 is a diagram of a location calculation, in accordance with the present invention.

An example of the location calculation following the transformation of the angles from the gravity vectors and camera image can be seen in FIG. 6. The radius of the circle r is the difference between the height of the light source and the average height of the camera ($Z_1-Z_c$) divided by the tangent of the elevation angle ($r=(Z_1-Z_c)/\tan(\alpha+\beta)$). The azimuth of the camera from the light source is 180°−m, where m is the azimuth of the light source from the camera relative to the Y axis and given by the corrected magnetometer reading. The distance of the camera relative to the light source parallel to the x axis, $\Delta x$, is the radius of the circle multiplied by the sine of the azimuth of the camera from the light source ($r \cdot \sin(180°-m)$) and the distance of the camera relative to the light source parallel to the y axis, $\Delta y$, is the radius of the circle multiplied by the cosine of the azimuth of the camera from the light source ($r \cdot \cos(180°-m)$). The location of the camera relative to an origin for the room in the x axis, $X_c$, is the sum of the location of the light source in the x axis, $X_1$, and the distance of the camera relative to the light source parallel to the x axis, $\Delta x$ ($X_c=X_1+\Delta x$) and the location of the camera relative to an origin for the room in the x axis, $Y_c$, is the sum of the location of the light source in the y axis, $Y_1$, and the distance of the camera relative to the light source parallel to the y axis, $\Delta y$ ($Y_c=Y_1+\Delta y$).

In another embodiment, referring back to FIG. 1, the light source 116 is a fixture that includes one or more light emitting diodes (LEDs) operable by the controller 112. For example, the controller 112 can operate the LED(s) to pulse in a unique optical pattern code identifying a location of the light fixture. Optionally, the backend server 130 can provide the unique identity code to drive the LED(s) to the controller, or can drive the LED(s) to pulse directly. The LED(s) could be part of the environmental lighting, or could be intended specifically for locationing (unrelated to existing building lighting). It is envisioned that each LED pulse would have a length of approximately one camera frame or more of the mobile device such that the camera will be able to detect the sequence of pulses of the unique optical pattern code. Longer and shorter pulses could be used. Several LEDs could be pulsed in different sequences to provide the unique optical pattern code.

If the LEDs are used for building lighting, then it would be necessary to leave the LEDs on for most of the time, i.e. the code can be represent by turning off the LED for at least one camera frame period in a defined identity code sequence. For example, the LEDs could be turned off on the 1st, 3rd and 29th frame. If the code sequence was to repeat every second and the camera frame rate was 60 Hz, there would be $2^{60}$ possible codes. It this case, it would be very easy to leave the LEDs on most of the time so no flashing is noticeable. Each camera frame can be scanned for the any LEDs in the image in order to build the code sequence for one second. If the LED is not used for building lighting, but is only an addition to an existing light fixture, then the LED can be left off for most of the time, i.e. the code can be represent by turning on the LED for at least one camera frame period in a defined identity code sequence. The LED could be switched for different pulse lengths, different colors, and/or different brightnesses to produce the unique optical pattern sequence. Once the light fixture is identified, the mobile device can refine its location in the same manner as was detailed above for the fluorescent light.

Figure 4:
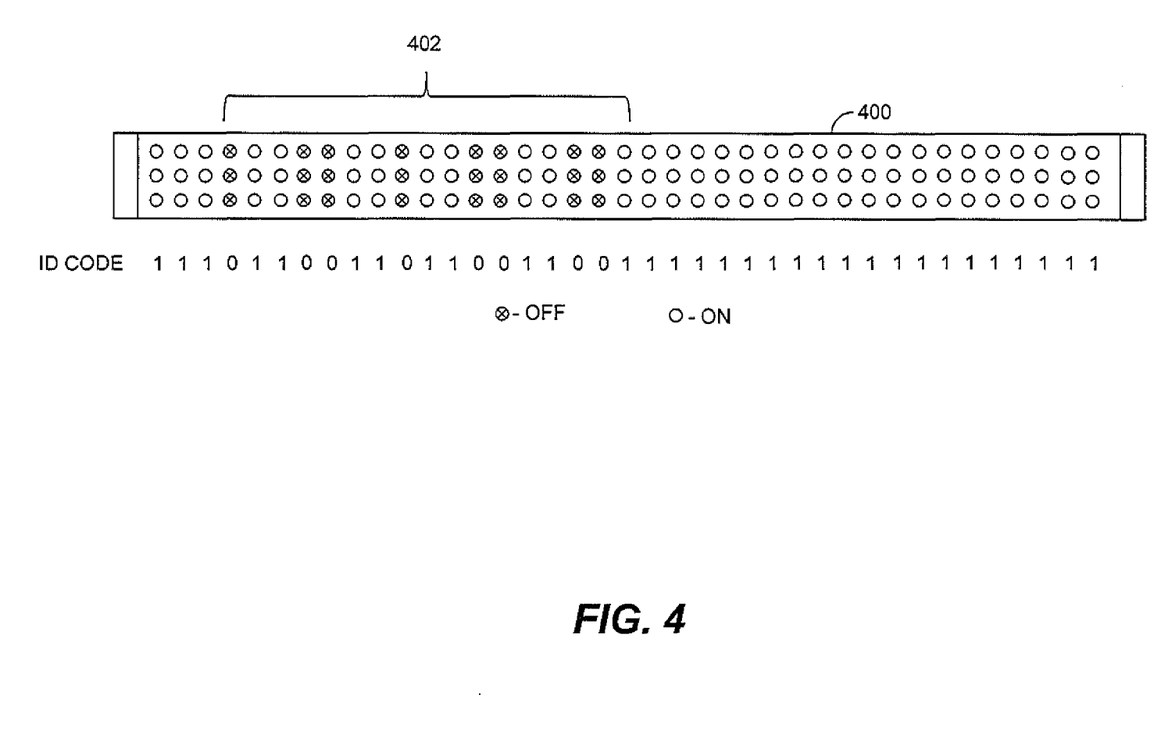
FIG. 4 is a front view of a modified LED bank, in accordance with another embodiment of the present invention.

In yet another embodiment, referring to FIG. 4, a bank 400 of LEDs can be substituted for the fluorescent lamp of FIG. 1, where the LEDs are turned off to create a one-dimensional barcode 402 out of the length of the fixture. In this case, the selected LEDs used for coding need not be turned off permanently, but can be turned off periodically, e.g. for only one camera frame every second. As a result all of the LEDs are turned on for most of the time, but the selected LEDs are turned off for $\frac{1}{60}^{th}$ of the time, as shown in the instance of FIG. 4. Optionally, the selected LEDs could be switched to provide different colors and brightnesses, similar to the different colors and opacities of FIG. 1. As before, the different colors and brightnesses can be used in order to reduce the number of code elements on each bank. The image processing circuitry of the mobile device will be able to discern and decode the particular LED color and brightness in order for it or the backend server to determine the unique identifying code for that fixture and its location to associate with the mobile device. Once the light fixture is identified and the mobile device region is located, the location of the mobile device can be refined using accelerometers/magnetometers in the same manner as was detailed above for the fluorescent light.

Once the location information of the mobile device is known, using any of the above scenarios, this location information can be used by the backend server to supply specific information related to that location to the mobile device, such as information about products in that location, for example. In addition, the backend server can push an interactive customer application to the mobile device relating to products in that location.

Figure 5:
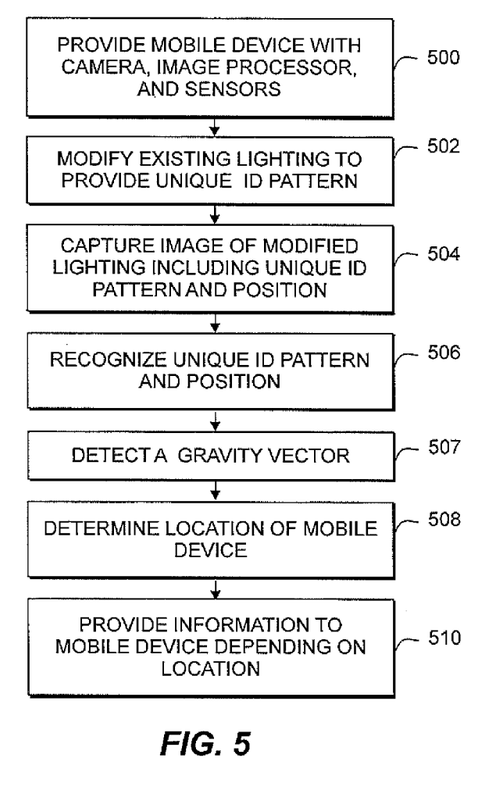
FIG. 5 is a flow diagram illustrating a method for locationing, in accordance with the present invention.

FIG. 5 is a diagram illustrating a method of locationing of a mobile device within an environment, according to some embodiments of the present invention.

A first step 500 includes providing a mobile device including a camera and an image processor coupled to the camera. The processor is operable to obtain images from the camera and recognize unique optical identity patterns in the image. The mobile device also includes sensors such as a three-axes accelerometer disposed therein, the accelerometer operable to detect gravity vectors of the mobile device.

A next step 502 includes modifying the operation of existing or new light sources within the environment, such as those that can be positioned on a ceiling of the environment, to provide a plurality of unique optical identity patterns, one for each light source, recognizable by the mobile device processor. The unique identity pattern for each light is associated with a particular location within the environment, which is stored in a map in the mobile device or a central server.

A next step 504 includes capturing an image of a modified light source by the camera of the mobile device.

A next step 506 includes recognizing the unique identity pattern of the modified existing light and converting this into a code by the processor. This step includes recognizing a horizontal angle and a vertical angle of a position of the light source in the image from an on-axis center position of the image view. This step can also include recognizing an orientation of the light source and an orientation of the identity pattern of the light source.

A next step 507 includes detecting gravity vectors for the mobile device. This can be determined by an accelerometer reading and/or other sensor data.

A next step 508 includes determining a location of the mobile device using the code derived from the unique identity pattern and a sum of the individual gravity vectors and the horizontal and vertical angles. This locationing can be performed by the mobile device itself, if it has a copy of a map that associates the codes with the pre-determined positions of the light sources, or in the backend server.

An optional next step 510 includes providing information to the mobile device based on its location.

Advantageously, the present invention provides a locationing system to locate a mobile device using slight modification of existing light sources within an environment. The present invention uses an existing camera and optical pattern recognition processing, which is available in nearly every smart phone that is manufactured today. The present invention can provide high locationing accuracy (e.g. one or two foot accuracy), high positioning update rates, low cost to add supporting infrastructure, and good performance in tight aisles with limited line of sight to large areas of ceiling.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors or processing devices such as microprocessors, digital signal processors, customized processors and field programmable gate arrays and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits, in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a compact disc Read Only Memory, an optical storage device, a magnetic storage device, a Read Only Memory, a Programmable Read Only Memory, an Erasable Programmable Read Only Memory, an Electrically Erasable Programmable Read Only Memory, and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits with minimal experimentation.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system for locationing of a mobile device within an environment, the system comprising:
    light sources disposed within the environment and modified to provide a plurality of unique identity patterns, one identity for each light source, each unique identity pattern is associated with a particular location within the environment;
    an accelerometer disposed in the mobile device, the accelerometer operable to detect gravity vectors of the mobile device;
    a camera and image processor disposed within the mobile device and operable to obtain images from the camera, the camera operable to capture an image of a modified light source, and the image processor operable to recognize the unique identity pattern of the modified light source and a horizontal angle and a vertical angle of a position of the light source in the image from a center position of the image; and
    a locationing engine operable to determine a location of the mobile device within the environment using the unique identity pattern, the gravity vectors, and the horizontal and vertical angles.

2. The system of claim 1, wherein the unique identity pattern establishes a location region of the mobile device, and a sum of the gravity vectors and the horizontal and vertical angles provides an elevation angle of the light source, with an assumed height of the mobile device off the floor, whereupon the mobile device is then determined to be located on a circle projected by a cone having sides angled at the elevation angle.

3. The system of claim 2, further comprising a magnetometer disposed in the mobile device, the magnetometer operable to detect an azimuth heading of the mobile device to locate the mobile device on the circle considering azimuth information derived from a magnetometer reading.

4. The system of claim 2, wherein the mobile device is located on the circle utilizing an orientation of the light source in the image.

5. The system of claim 4, wherein the mobile device is located the circle utilizing an orientation of the optical pattern.

6. A system for locationing of a mobile device within an environment, the system comprising:
  light sources disposed within the environment and modified to provide identities in the form of a plurality of unique identity patterns for each light source, each unique identity pattern is associated with a particular location within the environment;
  an accelerometer disposed in the mobile device, the accelerometer operable to detect gravity vectors of the mobile device;
  a camera and image processor disposed within the mobile device and operable to obtain images from the camera, the camera operable to capture an image of a modified light source, and the image processor operable to recognize the unique identity pattern of the modified light source and a horizontal angle and a vertical angle of a position of the light source in the image from a center position of the image;
  a locationing engine operable to determine a location of the mobile device within the environment using the unique identity pattern, the gravity vectors, and the horizontal and vertical angles, wherein the unique identity pattern establishes a location region of the mobile device, and a sum of the individual gravity vectors and the horizontal and vertical angles provides an elevation angle of the light source, whereupon the mobile device is then determined to be located on a circle projected by a cone having sides angled at the elevation angle with an assumed height of the mobile device off the floor, and
  a magnetometer operable to detect an azimuth heading of the mobile device to locate the mobile device on the circle considering azimuth information derived from a magnetometer reading.

7. A method of locationing of a mobile device within an environment, the method comprising the steps of:
  providing a mobile device including a camera and image processor operable to obtain images from the camera recognize unique identity patterns in the image, the mobile device also including an accelerometer disposed therein, the accelerometer operable to detect gravity vectors of the mobile device;
  modifying light sources within the environment to provide a plurality of unique identity patterns, one for each light source, each unique optical pattern is associated with a particular location within the environment;
  capturing an image of a modified light source by the camera of the mobile device;
  recognizing the unique identity pattern of the modified light source and a horizontal angle and a vertical angle of a position of the light source in the image from a center position of the image; and
  determining a location of the mobile device within the environment using the unique identity pattern, the gravity vectors, and the horizontal and vertical angles.

8. The method of claim 7, wherein the unique identity pattern establishes a location region of the mobile device, and a sum of the gravity vectors and the horizontal and vertical angles provide an elevation angle of the light source, with an assumed height of the mobile device off the floor, whereupon the mobile device is then determined to be located on a circle projected by a cone having sides angled at the elevation angle.

9. The method of claim 8, further comprising a magnetometer disposed in the mobile device, wherein determining includes detecting an azimuth heading of the mobile device to locate the mobile device on the circle considering azimuth information derived from a magnetometer reading.

10. The method of claim 8, wherein the mobile device is located on the circle utilizing an orientation of the light source in the image.

11. The method of claim 10, wherein the mobile device is located on the circle utilizing an orientation of the optical pattern.

* * * * *